United States Patent [19]

Hill et al.

[11] Patent Number: 4,893,567
[45] Date of Patent: Jan. 16, 1990

[54] RAILROAD FREIGHT CAR WITH WELL FOR STACKED CARGO CONTAINERS

[75] Inventors: Charles C. Hill; Thomas Gareth R., both of Del Mar, Calif.; Gary S. Kaleta, Warren; Gregory J. Saxton, Portland, both of Oreg.

[73] Assignee: Gunderson, Inc., Portland, Oreg.

[21] Appl. No.: 234,332

[22] Filed: Aug. 18, 1988

[51] Int. Cl.[4] .............................................. B61D 17/08
[52] U.S. Cl. ..................................... 105/419; 105/4.1; 410/52
[58] Field of Search ............ 105/418, 419, 414, 406.1, 105/404, 411, 4.1; 410/52, 90, 71

[56] References Cited

U.S. PATENT DOCUMENTS

| | | | |
|---|---|---|---|
| 717,488 | 5/1903 | Swanson | 105/418 |
| 3,319,583 | 5/1967 | Gutridge | 105/366 |
| 3,357,371 | 12/1967 | Gutridge | 105/366 |
| 4,091,742 | 5/1978 | Cordani | 105/366 |
| 4,456,413 | 6/1984 | Pavlick | 410/56 |
| 4,524,699 | 6/1985 | Pavlick | 105/4 |
| 4,599,949 | 7/1986 | Hill | 105/355 |
| 4,624,188 | 11/1986 | Kaleta | 105/355 |
| 4,703,699 | 11/1987 | Hill | 105/355 |
| 4,718,353 | 1/1988 | Schuller et al. | 105/406.1 |
| 4,750,431 | 6/1988 | Yates et al. | 105/4.1 |
| 4,771,706 | 9/1988 | Lindauer et al. | 105/415 |
| 4,792,269 | 12/1988 | Engle | 410/71 |

Primary Examiner—Robert R. Song
Assistant Examiner—Gary C. Hoge
Attorney, Agent, or Firm—Chernoff, Vilhauer, McClung & Stenzel

[57] ABSTRACT

A multi-unit articulated railway freight car defining a container well in each of the several units, with container support members attached to the side sills of each unit to support standard intermodal cargo containers at a location low enough to permit a second tier of containers to be stacked atop a bottom tier without exceeding the maximum height restrictions of most main railroad lines, although ample clearance is preserved beneath the bottom of the car when fully loaded. Each container support member is constructed of thick plate steel of high strength, formed cold to include residual internal stresses in order to resist failure when subjected to the loads imposed by supporting loaded containers carried in the container well. The side sill structures are of box tube and formed sheet construction of small enough width to permit carriage of newer, larger, sizes of intermodal cargo containers without the car or containers protruding outside the clearance available along most railroad lines. A truss structure interconnects the bottom chords of the side sills and interconnects the carbon container support members. Members of the truss structure are attached to the cargo container support members by hinges.

16 Claims, 6 Drawing Sheets

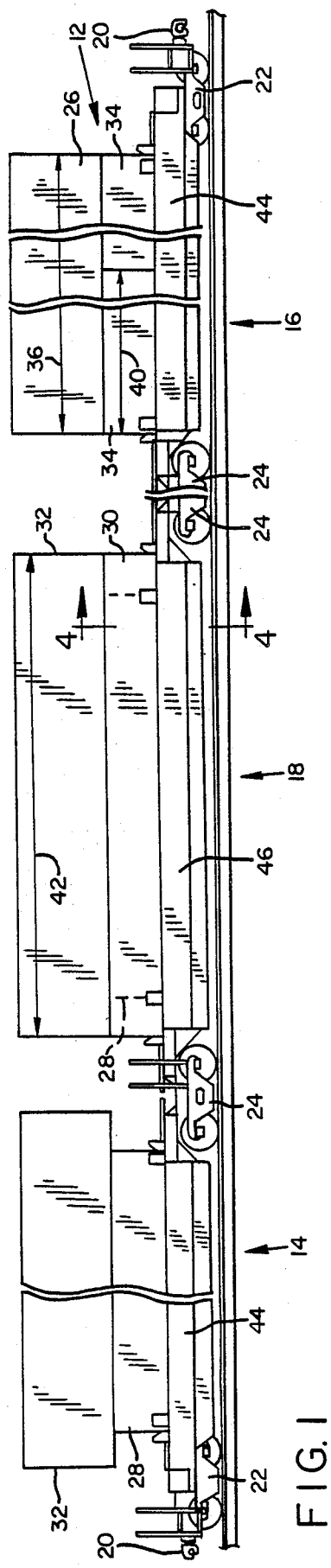
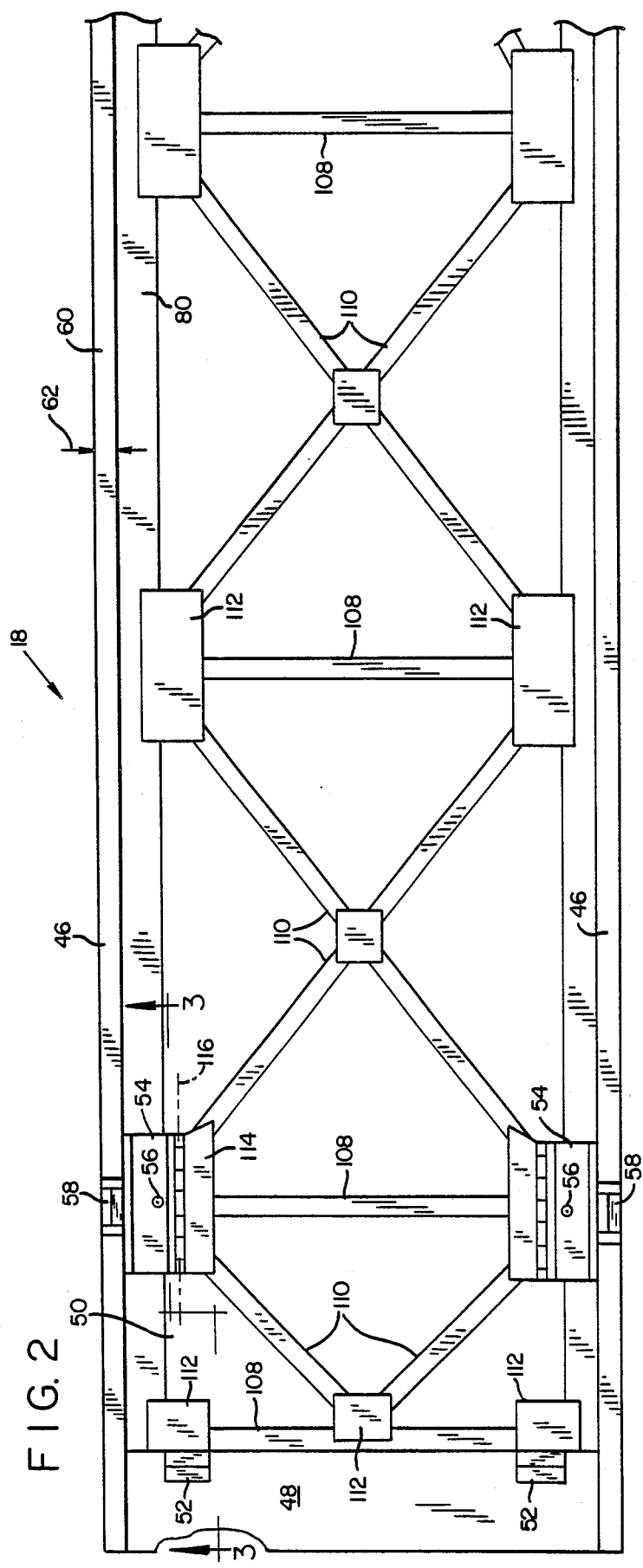

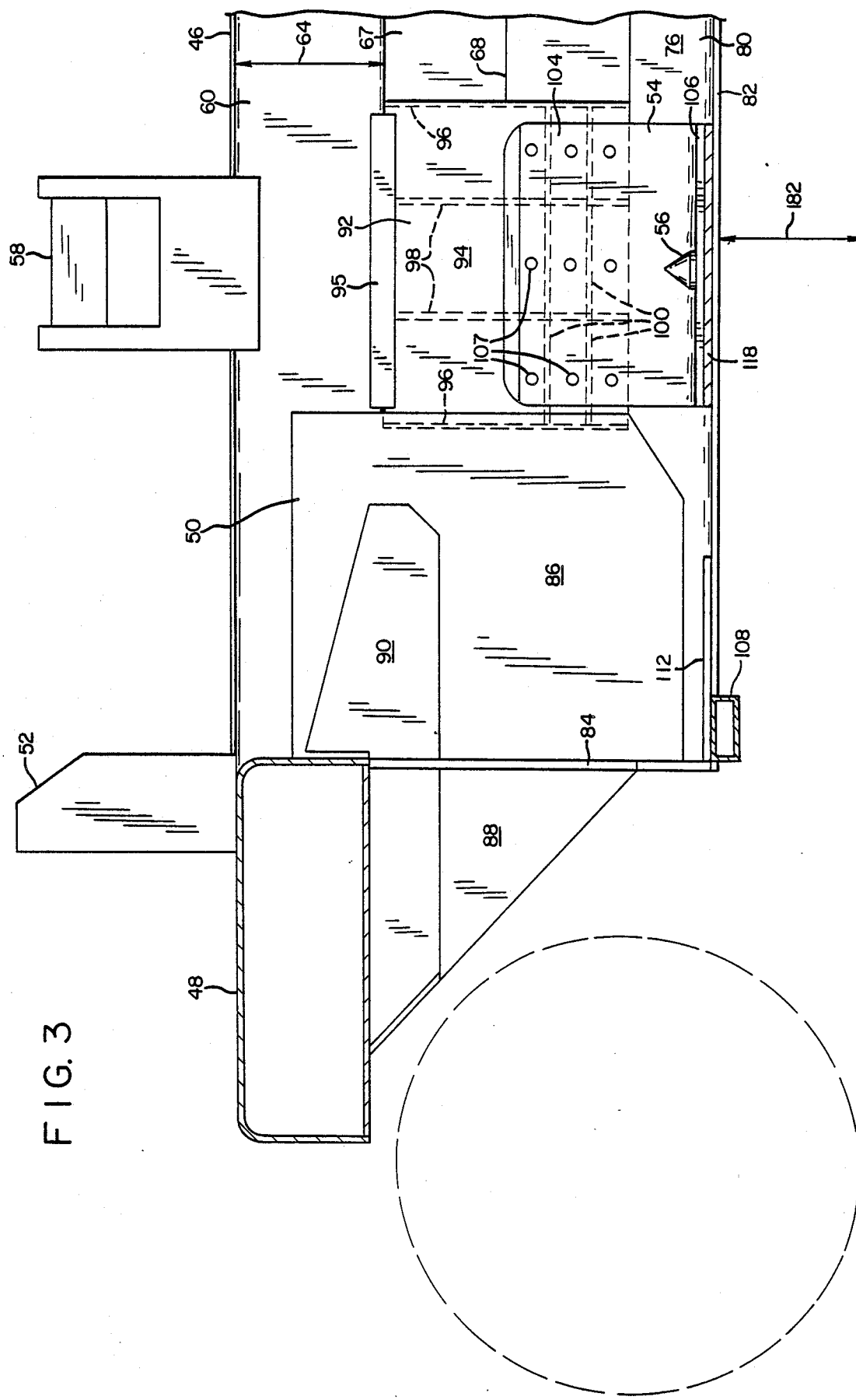

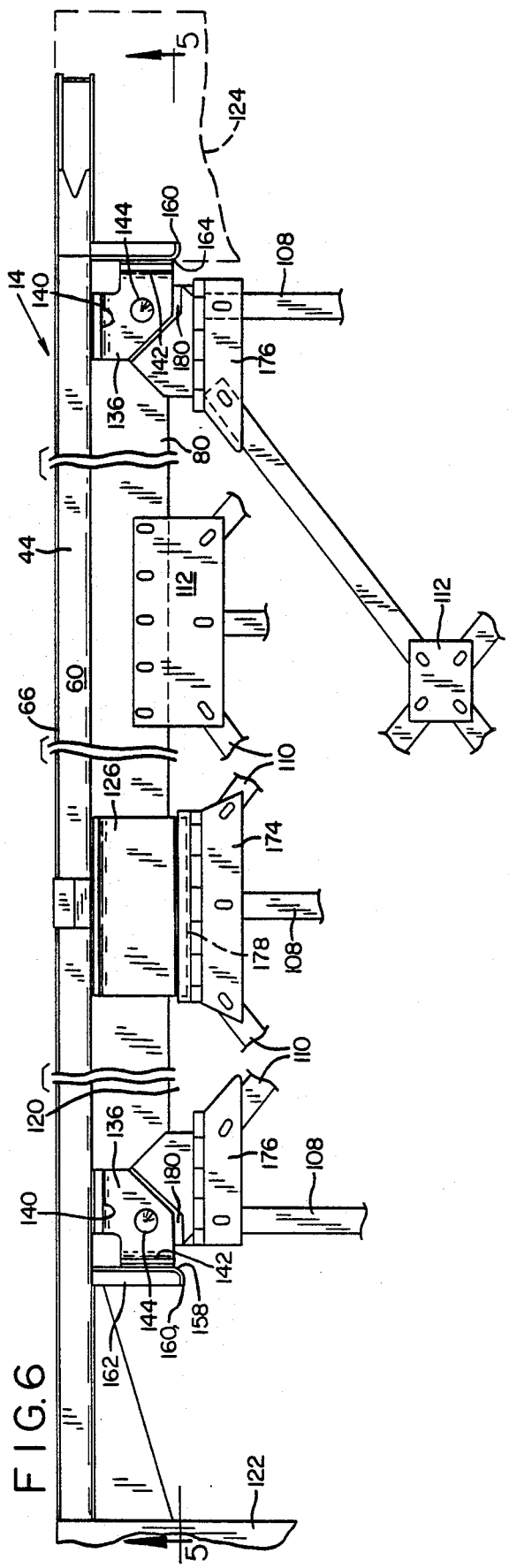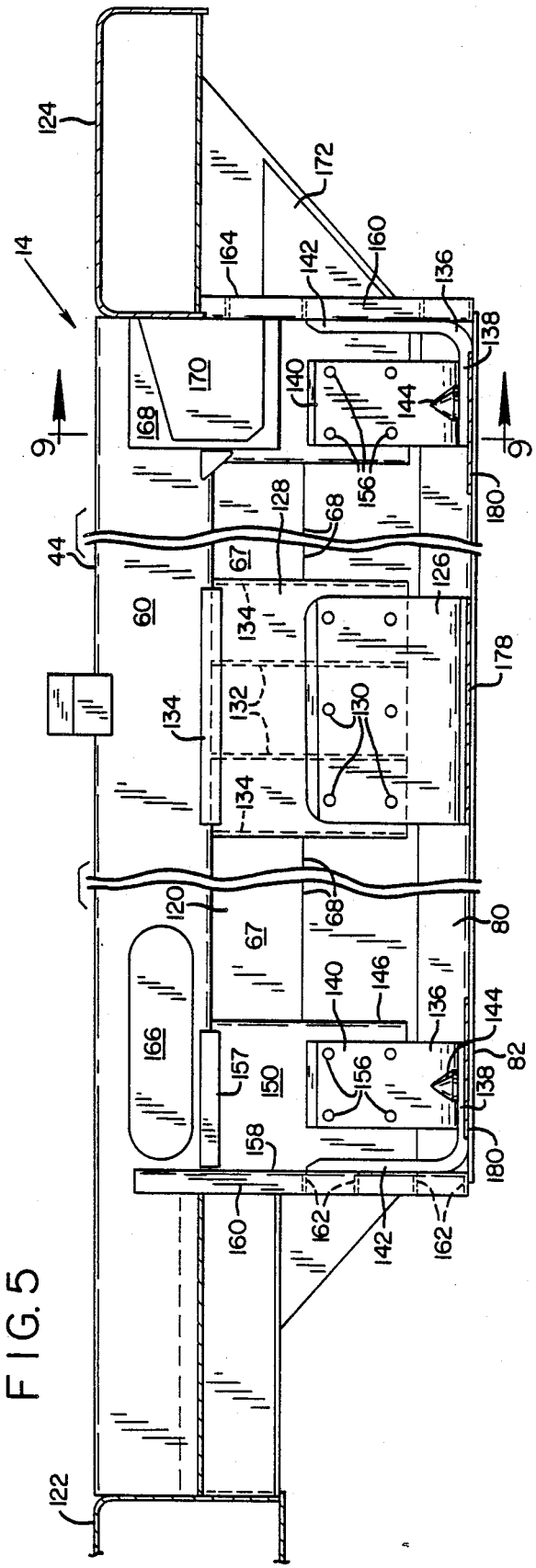

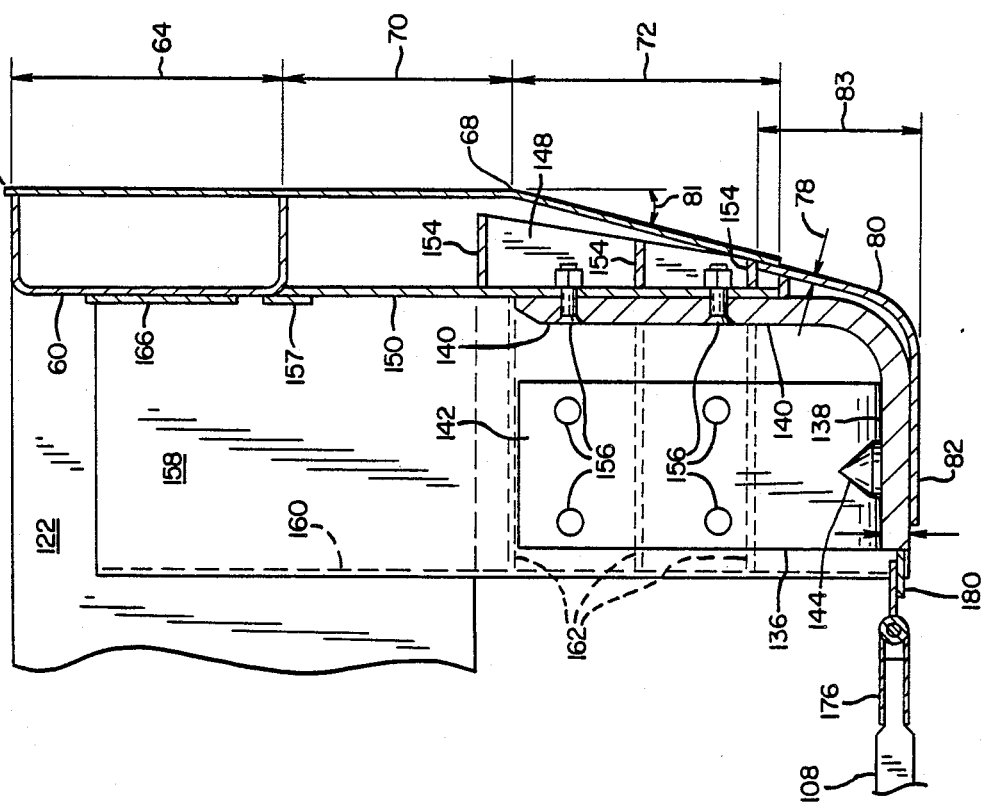
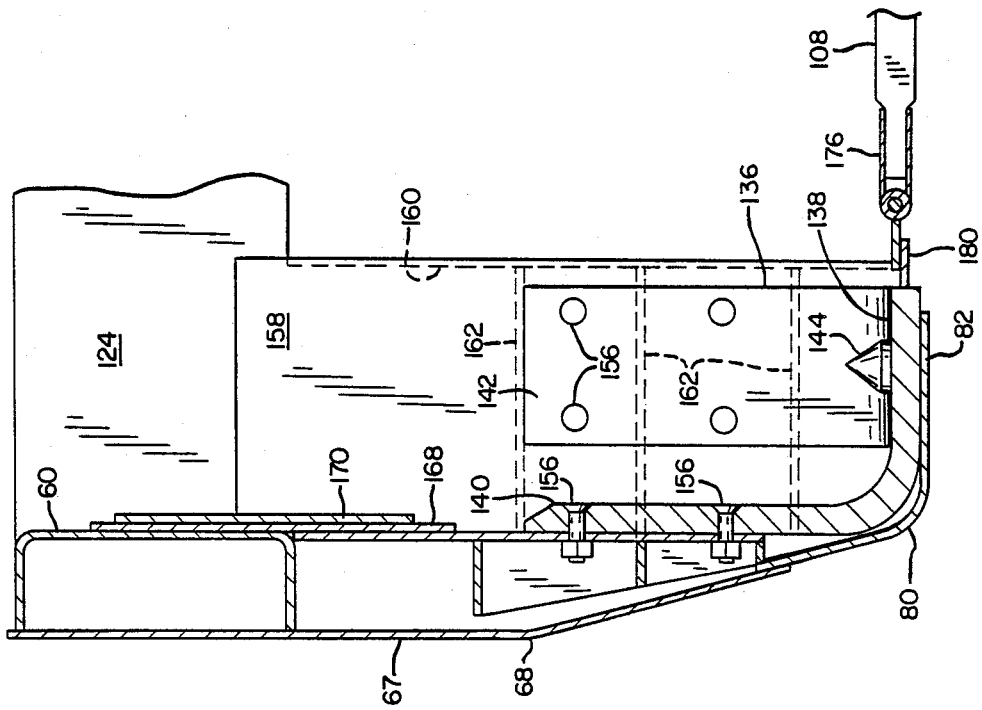

RAILROAD FREIGHT CAR WITH WELL FOR STACKED CARGO CONTAINERS

BACKGROUND OF THE INVENTION

The present invention relates to railroad cars, and particularly to a railroad car defining a well, for carrying intermodal cargo containers stacked one upon another In order to obtain better overall fuel efficiency in carrying containerized cargo over long distances, intermodal cargo containers are often carried on railroad cars in situations where rail transport does not interfere with achievement of required delivery dates. Multi-unit articulated railroad cars can be built strong enough to carry containers stacked one atop another, since containerized cargo is usually not so dense that car weight combined with the weight of loaded containers will exceed the maximum weights which can be imposed upon railroad tracks. When containers are stacked two containers high on a railroad car, however, overall height is a definite consideration, since only a limited height such as 20'2", or in some cases less, is available on some main railroad track lines, and it is therefore desirable to provide a car capable of carrying containers stacked two high yet with the maximum height of the loaded car as low as possible, even when carrying empty containers.

Similarly, the dimensions of a car capable of carrying containers must be within width restrictions resulting from signals and other equipment located alongside tracks. The width of a car midway between its trucks must be narrower when the truck spacing is greater, in order to remain within the available clearance envelope as curved track is negotiated by the car. Lateral clearance is particularly a problem in the design of railroad cars intended to carry containers such as 48-foot-long 102-inch wide containers, rapidly becoming an accepted size in the transportation industry, since such containers are of a greater width than shorter containers, and yet a car carrying such a container must still fit within the available clearance, since the cost of modifying railway track lines to provide greater clearance is prohibitive.

Sufficient clearance must also be maintained beneath a car while sufficient stiffness of the side sill structures and the floor structures, if any, of the car must be provided, and the maximum height of the side sills must be kept low enough to permit use of the container loading cranes and associated equipment in use at container loading yards.

Intermodal cargo containers are constructed to be carried with their weight transmitted through load carrying structures normally located at the corners of shorter containers and sometimes spaced longitudinally a short distance from the corners of longer standard containers. Standard containers include vertical load-bearing structures permitting such containers to be stacked one atop another and to be interconnected to prevent separation during transport. The locations of the load bearing structures in the containers are standardized so that containers having various lengths such as 20 feet, 24 feet, 40 feet, 45 feet, or 48 feet can be supported on support structures provided at standard spacings on highway truck chassis, railroad cars, and in container-ship holds. Such support structures must be capable of supporting the entire load of containers and the enclosed cargo, yet must fit within the limited amount of space available, which, in the case of containers on railroad cars, is defined partly by the clearance available along track lines. The problem of designing a car with sufficient strength to support cargo containers during operation of a train, where dynamic loads caused by track unevenness, car performance dynamics, centrifugal force, and wind forces are applied, is complicated by the desirability of rail carriage of wider, heavier, and longer containers, necessitating longer railroad car truck spacings, while keeping the lateral and vertical dimensions of the car within the available clearance envelope.

As a result of these competing considerations, the structure of a railroad car for carrying stacked cargo containers must be strong, yet shallow and narrow, yet not too expensive to build. Others have attempted to solve similar problems in previously available railroad cars by using corner castings or weldments incorporating container support structures, and have used stiffened floor structures interconnecting the side sills of a well car, in order to provide sufficient strength to carry the loads imposed by loaded intermodal cargo containers or trailers. Conventionally accepted engineering practice has taught previously that the construction of container support structures massive enough to support the expected loading, yet remain in the space available, would require heating the metal to bend, weld, or cast the necessary structure, adding to the cost of a car.

Previous attempts to construct a satisfactory railroad car for carrying the longer, wider, containers have not been entirely successful. They have resulted in an undesirably great height of a loaded car, particularly when carrying two containers stacked one atop the other with a light load weight, or they have been unable to withstand the forces of carrying loaded containers without early failure. As a result, what is needed is an improved railroad freight car for carrying large intermodal cargo containers with a resultant overall height of the loaded car which is as small as possible, yet with sufficient clearance beneath the car and with sufficient lateral clearance for operation of the loaded car on most railroad lines.

SUMMARY OF THE INVENTION

The present invention provides a lightweight railcar, which may be of multi-unit articulated construction, in which each car unit defines a well for carrying intermodal cargo containers stacked one upon another, and which achieves a combination of desirable objectives by having at least the minimum required clearance beneath the car and maintaining sufficient lateral clearance along the sides of the car, and still is capable of carrying two large containers stacked one upon another with an overall height which is low enough, in a design providing a car which is strong enough and durable enough.

The present invention provides a railcar having lightweight side sills each including a relatively deep rectangular tubular upper chord portion, a web portion which is a single thickness of plate material including a vertical upper portion, a diagonal portion extending inward and downward to contribute to a stiffer web structure, and a lower chord portion of material of substantially greater thickness than that of the web and the rectangular tube upper chord portion. The lower chord portion of the side sill includes a diagonally upwardly extending leg and a horizontal, inwardly directed leg. A truss structure of diagonally and transversely extending members connects the bottom chords of the two side sills to each other to assist in stiffening the structure of the whole car for purposes of resisting buckling of the side sills caused by the loads encountered during operation of the car.

Container support assemblies are attached to the side sills at particular locations to receive the load supporting structural portions of cargo containers. The container support structures each include a container support hanger bracket weldment of plate material including a vertical face portion substantially parallel with the side sill, and vertical and horizontal stiffener portions perpendicular to the vertical face. The hanger brackets are fastened by welding to the side sill top tube and web. A container support member is of relatively very thick, high strength plate material, bent on an exceptionally small radius of curvature, without heating, to define a horizontal portion on which a load bearing structure of a container is supported, and one or more upwardly extending portions.

Forming the bend in the lower chord of the side sill structure, and the bend between the horizontal and the upwardly extending portions of the container support members without heating the metal develops residual internal stresses which are important to the present invention in providing increased strength in the desired direction to make the car of the invention capable of withstanding the stresses expected to be imposed and less susceptible to fatigue cracking of the metal. Mechanical fasteners, such as rivets or bolts, are used to attach the container support member to the hanger bracket assemblies, rather than welding the container support members to the side sills, to avoid the problems which accompany welding thick structures of high strength steel, so as to avoid degrading the fatigue resistant characteristics and preserve the advantages derived by cold forming of the metal.

In the case of a car unit designed to accept containers no longer than a standard 40' container, a container support member may be attached to the body bolster of the car, as well as to the side sill, by an additional hanger bracket welded to the body bolster and depending downwardly therefrom. A respective upwardly extending portion of such a container support member is attached by mechanical fasteners to the hanger bracket depending from the body bolster.

Horizontal transverse and diagonal tension/compression members may be attached to each of a pair of oppositely located container support members by the use of a hinge whose hinge axis of rotation extends horizontally and longitudinally of the car, permitting the container support member to flex when loaded, without applying bending stresses to the horizontal members joining the oppositely located support members. Additionally, downward flexion of the container support member will bring it to bear downwardly upon the upper surface of the inwardly directed horizontal leg of the lower chord of the side sill, which will then provide a portion of the necessary upwardly directed force to support a container.

The choice of a high strength metal and ample length of the container support members provides the required strength to withstand expected loads safely without the need to use material so thick that it would occupy space which is critically limited in the corner area at the bottom edge of the side sills. The car of the present invention is thus able to be constructed to fit within the available clearance, yet provides sufficient interior width in the container well to accept standard cargo containers nominally 102 inches wide.

It is therefore a principal object of the present invention to provide an improved lightweight railcar for carrying cargo containers stacked one upon another.

It is a further object of the present invention to provide an improved railcar capable of carrying wide, long, standard intermodal cargo containers stacked one upon another without extending beyond applicable clearance limitations.

It is yet a further object of the present invention to provide an improved railcar having capacity to carry a greater weight of revenue-producing lading, in a car of lighter weight.

It is an important feature of the railroad car of the present invention that it includes a container support member of thick high strength steel plate supported by and fastened by mechanical fasteners to a hanger bracket welded to the side sill of the car.

It is a further feature of the present invention that it provides a side sill of strong yet lightweight construction.

An additional feature of the present invention is the provision of hinges connecting transverse tension members to the container support members on opposite sides of the car.

A principal advantage of the present invention is that it provides an improved railcar of sufficient strength, and able to carry loaded cargo containers closer to the rails, yet with sufficient bottom clearance.

A further advantage of the railcar of the present invention is that it provides sufficient strength and load-carrying capacity in a car which can be built more economically than previously available railcars for the same purpose.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevational view of an exemplary articulated, multi-unit freight car embodying the present invention.

FIG. 2 is a top plan view, at an enlarged scale, of a portion of an intermediate unit of the articulated multi-unit freight car shown in FIG. 1.

FIG. 3 is a sectional view, at an enlarged scale, taken along line 3—3 of FIG. 2, showing a side sill and a container support of an intermediate unit of the car shown in FIG. 1.

FIG. 5 is a sectional view of a portion of an end unit of the car shown in FIG. 1, taken along line 5—5 of FIG. 6.

FIG. 6 is a top plan view of a portion of an end unit of the multi-unit freight car shown in FIG. 1, at an enlarged scale.

FIG. 8 is a sectional view of a portion of an end unit f the freight car shown in FIG. 1, taken along line 8—8 of FIG. 7.

FIG. 9 is a sectional view, at an enlarged scale, of a portion of the end unit shown in FIGS. 5 and 6, taken along the line 9—9 of FIG. 5.

DETAILED DESCRIPTION OF THE INVENTION

Figure 4:
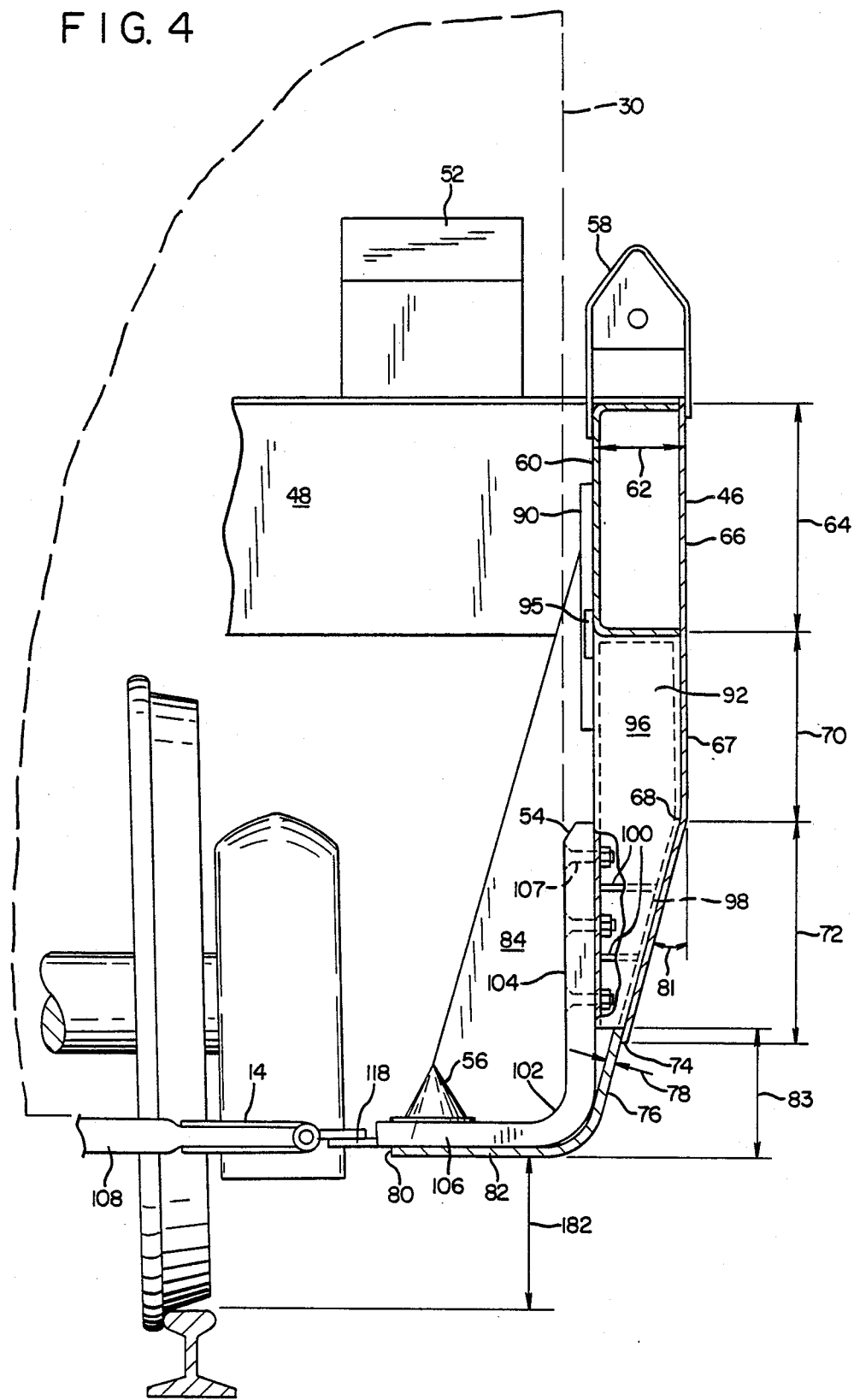
FIG. 4 is a sectional end elevational view of a portion of an intermediate unit of the multi-unit car shown in FIG. 1.
Figure 7:
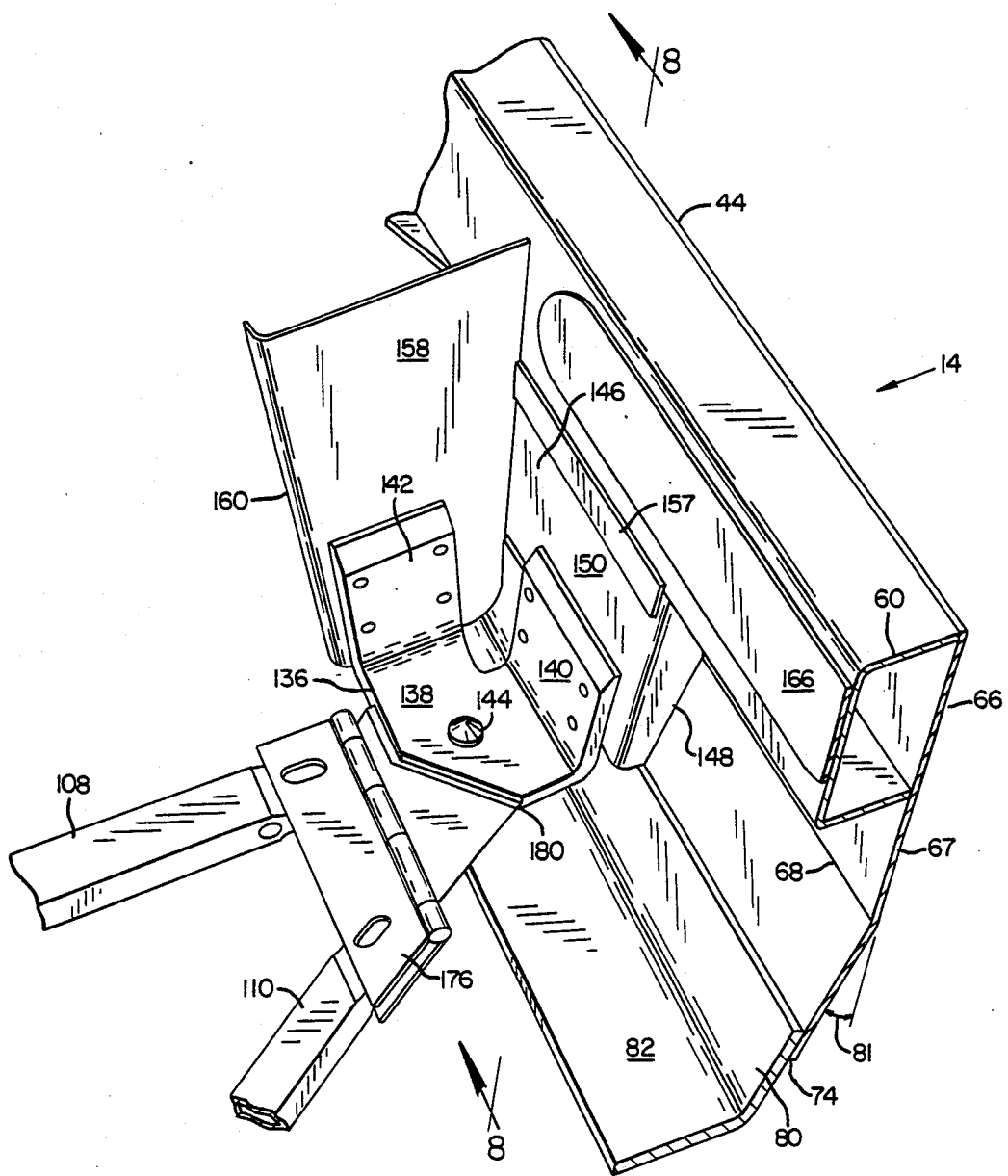
FIG. 7 is a perspective view, at an enlarged scale, of a portion of a coupler end of an end unit of the car shown in FIG. 1, showing a container support assembly.

Referring now to the drawings, a multi-unit, articulated railway freight car 12 includes a pair of end units 14 and 16 and at least one intermediate unit 18, of which only one is shown completely. A coupler 20 and a truck 22 are provided at each end of the car, and trucks 24 are provided between each end unit 14 or 16 or intermediate unit 18 and the adjacent intermediate unit 18. Because each truck 24 supports the ends of both an intermediate unit 18 and either another intermediate unit 18 or an end unit 14 or 16, the trucks 24 should have a greater weight-carrying capacity than is necessary for the trucks 22 at each end of the car 12.

As shown in FIG. 1, each of the end units 14, 16 is capable of carrying a pair of cargo containers 32 and 28, with the container 32 stacked atop the container 28. In the intermediate unit 18 a container 30 is carried with a container 32 stacked atop it. In each case the upper container is securely fastened to the lower container using conventional connectors.

Alternatively, a shorter container 28, indicated by broken lines, could be held in the lower tier of the intermediate unit 18, below the container 32. Further, a pair of containers 34, each half as long as a single container 28, could be placed in the lower tier of either of the end units 14 or 16, as shown in the end unit 16, and a single container 32 might be stacked atop the container 28, as shown on the end unit 14 at the left end of FIG. 1.

Cargo containers of the sort used for intermodal transportation of goods are available in several standard sizes, and the car 12 is intended to be able to carry containers of a number of such sizes. For example, the cargo container 26 may be a standard cargo container having a nominal length 36 or 40 feet. Similarly, the cargo container 28 may be a standard 40-foot container. The cargo container 30, shown in the lower tier of the intermediate unit 18 in FIG. 1, like the cargo container 32, shown in the upper tiers of end unit 14 and of the intermediate unit 18 illustrated in FIG. 1, may be a cargo container having a length 42 of 48 feet, which overhangs each end of the 40-foot container 28 shown in the end unit 14 and stacks evenly above the container 30 shown in the intermediate unit 18. The shorter containers 34 shown in the lower tier of the end unit 16 may be standard containers having a length 40 of 20 feet.

The car 12 is generally of welded steel construction, which will be understood as the means of interconnection of parts described, unless otherwise specified. Each of the end units 14 and 16 has a pair of side sills 44, and each of the intermediate units 18 has a pair of side sills 46. Referring now also to FIGS. 2, 3, and 4, about one-half of the length of an intermediate unit 18 is shown in top plan view in FIG. 2. A body bolster 48 extends transversely between the side sills 46 at each end of the intermediate unit 18, the two ends of which are generally similar, and a container well 50 is defined between the side sills 46 and the body bolsters 48, to receive a cargo container in a position as low as it can be carried. A pair of end container guides 52 are located on each of the body bolsters 48 and include sloping surfaces to guide a container such as the container 30 into the container well 50 during loading of the car unit 18.

The entire weight of the container 30, and additionally of any container such as the container 32 stacked atop the container 30, is carried by a pair of container support assemblies, each including a container support member 54, the main load support on which a container rests. The container support members 54 are located near each end of the car unit 18 and supported by attachment to the side sills 46. The container support assemblies are located, with respect to one another and to the container well 50, where the corner castings of 40-foot containers such as the container 28 will rest upon the container support members 54. The corresponding structural members in longer containers such as standard 45-foot containers or in 48-foot containers such as the container 30 or the container 32 will rest upon the container support members 54, each of which has mounted upon it a standard container locator cone 56.

Mounted atop each of the side sills 46 adjacent the respective ones of the container support assemblies are container guides 58 to guide containers laterally during loading into the container well 50. Preferably, the container guides 58 are adjustable to guide and provide lateral support for containers such as a standard 40-foot container 28, which are narrower than the 102-inch wide 48-foot container 30, although the particular design of such a guide 58 does not form a part of the present invention.

As may be seen most clearly in FIG. 4, each of the side sills 46 has a top chord including a top tube consisting preferably of a formed channel 60 having a pair of legs extending horizontally and laterally outward from the container well 50, with the vertical base or central section of the channel member 60 being significantly larger than the legs, so that the top tube has a width 62 and a top tube height 64 which is approximately 2½ times as great. A single web plate 67 of metal forms the outer wall 66 of the top tube, as well as serving as the web of the side sill 46, while the base or central portion of the channel 60 provides a flat vertical inner wall or side of the top tube. The web plate 67 continues downward vertically beyond the bottom of the channel 60 to a bend along a horizontal line indicated at 68 and thence extends diagonally downward and inward to a position beneath the channel 60 and about two-thirds of the way from the outer side 66 to the inner side of the top tube. The distance 70 downward from the top tube to the bend 68, and the distance 72, from the bend 68 to the bottom margin 74 of the web plate 67 are preferably about equal, the distance 72 being somewhat greater to include a distance of overlap between the margin 74 and an upwardly directed leg 76 of a bottom chord member 80, which is a plate of metal having a thickness 78 which is significantly greater than the thickness of the web plate 67. For example, the distance 70 is about 12-3/16 inches, the distance 72 is about 14 inches, the top tube height 64 is about 14-9/16 inches, the top tube width 62 is about 5-11/16 inches, and the channel 60 and the web sheet 67 are both of steel plate ¼ inch thick, in one embodiment of the invention, in which the thickness 78 is ½ inch and the bend 68 defines an angle 81 of about 15° from planarity (FIG. 4). The upwardly extending leg 76 continues in the same direction as the portion of the web plate 67 below the bend 68, and thence is bent with a moderately large radius to extend inward as a horizontal leg 82 of the bottom chord member 80. The bottom chord 80 may thus have a height 83 of about 8-5/16 inches.

Both the bend 68 in the web plate 67 and the inward bend between the upwardly extending leg 76 and the horizontally extending leg 82 of the bottom chord 80 are preferably formed cold in the metal, while the legs of the channel 60 are welded to the outer wall 66 of the top tube, and the bottom margin 74 of the web plate 67 is welded to the bottom chord 80. This construction provides a lightweight yet stiff side sill 46 having three parallel longitudinal panels of light weight, including the outer side 66 of the top tube, with reinforcement provided in the top portion of the side sills 46 by the formed channel 60 and at the bottom by the relatively heavy plate bottom chord 80.

Additional rigidity is provided at each end by a vertical transverse gusset member 84, preferably of material of the same thickness as the web plate 67. For the same reason, a closure plate 86 extends vertically on the inner side of the channel 60 and extends downwardly to be connected by welding to the bottom chord 80, as may be seen best in FIG. 3. A gusset plate 88 and a doubler 90 reinforce the connection of the side sills 46 to the body bolsters 48 of the intermediate unit 18.

Each of the container support members 54 is connected to the respective side sill 46 by a hanger bracket assembly 92 of welded plate construction including a main plate 94 defining a vertical inner face and a pair of transverse vertical flange portions 96 formed by bending the plate. Vertical stiffeners 98 and horizontal stiffeners 100 are also welded to the outer side of the main plate, extending toward the web plate 67 of the side sill 46. Preferably, the main plate 94 and the vertical stiffeners 98 are at least as thick as the web sheet 67, and the horizontal stiffeners 100 are thicker.

The container support members 54 are of relatively very heavy steel plate material, at least about one inch thick, for example being 1½ inches thick, and are bent at 102 with a radius of curvature of the inner surface of about three inches (4⅛ inches for the outside surface), without heating the metal, to form an upwardly directed vertical leg 104 and a horizontal portion foot 106. Chamfered holes are formed and mechanical fasteners 107 having countersunk heads are inserted through the holes and through corresponding holes provided in the main sheet of the hanger bracket assembly 92 to fasten the vertical leg 104 of the container support member 54 to the hanger bracket assembly 92, so as to avoid the disadvantages, such as the weakening of portions of the metal, which might occur as the result of fastening the container support member 54 to the hanger bracket assembly 92 by a welded joint. The fasteners 107 may be threaded fasteners, rivets, or lock bolts having annular grooves and to which a nut is swaged with the bolt under tension. Such fasteners should at least meet the requirements of ASTM A325.

Preferably, the container support member 54 is of a high strength steel which will include residual internal stresses as a result of the cold bending process. These residual internal stresses will provide resistance to fatigue cracking and early failure of the container support members 54. A preferred material for the container support members 54 is a low carbon age hardening alloy steel according to ASTM specification A710 Grade C, Class 3 Modified, having 90,000 psi tensile strength and 80,000 psi yield point, which is available, for example, from Oregon Steel Mills of Portland, Or.

After the container support member 54 is fastened to the respective bracket assembly 92, the hanger bracket assembly 92 is welded to the side sill 46, along the vertical transverse flange portions of the main plate of the hanger assembly 92 and along the bottom of the top tube, where a narrow bridging plate 95 connects the upper margin of the main plate 94 to the inner face of the channel member 60, with the horizontal foot 106 of the container support member 54 adjacent the top surface of the horizontal leg 82 of the bottom chord member 80. As may be seen in FIGS. 2 and 3, the container support member 54 extends longitudinally of the car a sufficient distance to provide the necessary load carrying capacity to carry the expected loads imposed by the weight of the containers 30 and 32 and their contents, together with the dynamic stresses imposed by such factors as crosswind, uneven track, track curvature and centrifugal force, and harmonic motion of the car during operation.

Referring particularly to FIGS. 2 and 4, a truss structure including a plurality of transverse members 108 and diagonal members 110 is provided to stiffen the car unit 18. The truss structure interconnects the opposite bottom chord members 80 at several places where attachment plates 112 are welded to the bottom chords 80, and also interconnects each container support member 54 with the laterally opposite one and with the portions of the truss structure fastened to the bottom chords 80. This serves to support the side sills 46 against buckling under the various loads to which they may be subjected during operation of the car 12. The truss members 108 and 110 also would be able to serve to support part of the lading of a container 30 carried in the car unit 18, should the floor of the container fail. Further, the horizontal leg 82 of the bottom chord 80 (FIG. 4) is sufficiently wide to assist in supporting lading in the case of a container floor failure.

At the positions along the side sills 46 where the container support members 54 and their hanger brackets 92 are located the truss members 108 and 110 are attached by welding to one side 114 of a hinge having an axis of rotation 116 extending horizontally and longitudinally of the car unit 18, while the other side of the hinge is connected to the horizontal foot 106 by being welded to an attachment plate 118 which is welded to the margin of the container support member 54. The truss members 108 and 110 preferably are constructed of rectangular tubular stock with end portions of the truss members 108 and 110 crushed to occupy a smaller height where they are welded to the attachment plates 112 and hinge sides 114.

As a result, the container support members 54 will subject the transverse truss member 108 and diagonal truss members 110 connected to the side portion 114 of the hinge substantially only to tension stresses and not to bending stresses, resulting from loads imposed on the container support member 54 by cargo containers carried in the car unit 18. The horizontal foot 106 of each container support member 54 will thus be able to be deflected downwardly as the container support member 54 flexes, without causing the connection of the truss members to the container support member 54 to fail. Downward deflection of the container support members 54 will also bring them downward into contact with the top surface of the horizontal leg 82 of the bottom chord 80, which will then absorb a portion of the forces exerted downwardly on the container support member 54.

The end units 14 and 16 include shorter container wells than the container well 50 of the intermediate unit 18, because of the need to have an end platform, a complete truck, and a coupler at each end of the multi-unit car 12, and because of the need to have the spacing between truck centers short enough not to unduly limit the maximum width of the car units 14 and 16. The units 14 and 16 are basically identical, except for the location of safety appliances which do not form a part of the present invention, and therefore only the unit 14 is shown in detail in the drawings. As shown in FIGS. 5 and 6, a container well 120 is defined between the side sills 44, which are interconnected by a coupler end body bolster 122 and a body bolster 124 at the opposite end of the car unit 14, which is coupled through an articulating coupling and a truck shared jointly by the car unit 14 and the adjacent intermediate unit 18.

Except for a somewhat shorter length and details of connection to the body bolsters 122 and 124, the side sills 44 are generally similar in construction to the side sills 46 previously described as part of the intermediate unit 18, and will not be described in detail. The corresponding components of the side sills 44 are labeled in the drawings using the same reference numerals as those used in connection with the previous description of the side sills 46.

Since the end units 14 and 16 are intended to be able to carry a pair of cargo containers 34, each 20 feet long, a container support member 126, generally similar to the container support members 54, is provided at mid-length of the container well 120. The channel member 60 may be of 5/16 inch plate, and the bottom chord 80 of 9/16 inch plate in the end units 14, 16 to support the resulting mid-span loading of the side sills 44. A container hanger bracket assembly 128 is welded to the top tube channel 60 and web plate 67 after the support member 126 has been fastened to it by mechanical fasteners 130. The structure of the hanger bracket assembly 128 is similar to that of the hanger bracket assembly 92, except that there need not be horizontal stiffeners corresponding to the stiffeners 100 in the hanger bracket assembly 92, although there are vertical stiffeners 132 and flanges 134 which act as vertical stiffeners. Also, because of the lighter loads expected to be supported by the container support member 126, fewer mechanical fasteners 130 are required than the number of mechanical fasteners 107 used for the container support members 54 of the intermediate units 18, and lighter material, for example 1⅛ inch plate steel of the same type used for the container support members 54, may be used as the container support member 126, also bent to an inside surface radius of curvature of about three inches, without heating. As with the hanger bracket assemblies 92, attachment of the hanger bracket assemblies 128 to the channel member 60 includes the use of a narrow bridging plate 134 extending from the vertical inner side of the channel 60 to the vertical inner surface of the hanger bracket assembly 128.

A container corner support member 136 defines each of the four corners of the container well 120, and is constructed of the same sort of heavy plate material as used for the container support members 54, cut and bent without heating with a radius of curvature of two inches for the inside surface (and 3½ inches for the outer surface), to include a horizontal bottom portion or foot 138 and a pair of upstanding leg portions, a side portion 140 and an end portion 142. It will be recognized that the container support members 136 will necessarily be provided in pairs of opposite hand, but otherwise are similar. A container locating cone 144 is provided on the horizontal bottom portion 138 of each of the container support members 136.

The upstanding side portion 140 of each of the corner support members 136 is attached to the side sill 44 by a hanger bracket assembly 146. A single flange 148 is perpendicular to the main plate 150 of the hanger bracket assembly 146, facing away from the container well 120, and a vertical stiffener 152 and three horizontal stiffeners 154 are welded to the main plate 150, also extending away from the container well 120. Four mechanical fasteners 156, which may also be similar to the mechanical fasteners 107 of the container support members 54, are used to attach the vertical side portion 140 to the hanger bracket assembly 146. A narrow bridge plate 157 is used to connect the main plate 150 of the hanger bracket assembly 146 to the channel member 60 by welding, and the flange 148 is welded to the web portion 67 of the side sill 44.

A pair of end hanger brackets 158, of right and left hand, are provided at the coupler end of each of the end units 14 and 16, and extend generally transversely and vertically, each having a respective flange 160 and horizontal stiffeners 162 directed away from the interior of the container well 120. The vertical end portion 142 of the container corner support member 136 is fastened to the end hanger bracket 158 by mechanical fasteners 156, and the end hanger bracket 158 is attached by welding to the channel portion 60, to the adjacent main plate 150 of the hanger bracket assembly 146, and to the interior side of the side sill 44.

The hanger bracket assembly 146 and the end hanger bracket assembly 158 are positioned with respect to the side sill 44 so that the horizontal bottom portion 138 is located closely atop the horizontal leg 82 of the bottom chord member 80 of the side sill 44 as discussed previously in describing attachment of the container support members 54.

At the opposite end of the end units 14 and 16 a pair of end hanger bracket assemblies 164, of opposite hands, are provided. The end hanger bracket assemblies 164 are generally similar to the end hanger brackets 158, except that the vertical flange portion 160 of each hanger bracket assembly 164 is welded to the bottom of the body bolster 124 and the top margin of the main plate of the hanger bracket assembly 164 is welded to the vertical face of the body bolster 124, extending only to a lesser height than that of the end hanger brackets 158.

A doubler plate 166 is provided on the vertical inner side of the channel member 60 above each hanger bracket assembly 146 at the coupler end of the unit 14. Reinforcing plates 168 and 170 and a gusset 172 are provided on each side at the opposite, intermediate end of the end unit 14 to provide adequate strength in the area of the connection of the side sills 44 to the body bolster 124.

As shown best in FIG. 6, a truss structure interconnecting the bottom chords 80 and similar to that described in connection with the intermediate unit 18 is provided in each of the end units 14 and 16. The truss structure includes a plurality of transverse members 108 and diagonal members 110 which serve the same purpose described in connection with the truss structure of the intermediate unit 18. Except at the locations of the container corner support members 136 and container support members 126, attachment of the truss structure members 108 and 110 to the bottom chord members 80 is accomplished by attachment plates 112 as in the intermediate units 18. Attachment of the truss members 108 and 110 to the container support members 126 and container corner support members 136 is accomplished by the use of hinges 174 and 176, respectively, which define hinge pivot axes extending horizontally and longitudinally of the unit 14 or 16 in order to function in substantially the same manner as the hinges 114. The hinges 174 are attached to the container support members 126 by respective hinge attachment plates 178 welded to the margin of the container support member 126, and the hinges 176 are fastened to the container corner support members 136 by hinge attachment plates 180 welded to the respective margins of the horizontal bottom portion 138 of the container corner support member 136. Attachment of the truss structure to the container support members 126, 136 in this manner is accomplished for the reasons discussed previously in connection with the container support members 54.

Preferably, a car 12 will include end units 14 and 16 and three intermediate units 18, utilizing end trucks 22 of 70 ton design and intermediate trucks 24 of 125 ton design and will safely accommodate loaded cargo containers of the sizes described hereinabove, providing an ample clearance distance 182 (FIG. 4), beneath the loaded car 12 and on each side, and without exceeding the maximum height limitations of the major rail lines, as a result of the high strength of the container support members 54, 126, and 136 in combination with the light but strong design of the side sills 44 and 46, as supported by the truss structure interconnecting the bottom chord members 80 of the side sills of the several units of the car 12.

While it would be possible to provide container support members similar to the container support members 126 at mid-length of the intermediate units 18 to permit carriage of a pair of shorter containers such as standard 20′ or 24′ containers in the container well 50, the additional weight which would result from strengthening the side sills 46 to support loading at such a location, in view of the greater length of the side sills 46, would detract from the freight-earning cargo capacity of the car because of current limitations on the maximum loading which can be imposed on the railroad tracks, and would therefore be uneconomical.

It will be understood that a single unit having a pair of couplers 20 and a pair of trucks such as the trucks 22 may also be provided utilizing the structure of the present invention. It will also be understood that the car 12 may be constructed with shorter end units 14, 16 and intermediate units 18, if desired, for carriage of special containers of unusually dense lading.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A container support assembly for use in a railroad freight car including a pair of side sills defining a well for receiving and carrying intermodal cargo containers and other loads concentrated at separate discrete locations rather than being spread uniformly over large areas, said container support assembly comprising:
   (a) a main load support member of high strength steel plate bent to include a horizontal load-supporting foot portion and at least one upwardly directed leg portion;
   (b) an attachment hanger bracket assembly of thinner metal plate members welded together and adapted to fit against and be welded to one of said side sills; and
   (c) a plurality of mechanical fasteners attaching a respective one of said upwardly directed leg portions to said hanger bracket assembly.

2. The container support assembly of claim 1, further including an end hanger bracket of metal plates, including an inner face plate, said end hanger bracket being attached to a respective upwardly directed leg portion of said main load support member by mechanical fasteners.

3. The container support assembly of claim 2 wherein each of said hanger bracket assembly and said end hanger bracket includes a main plate having at least one outwardly directed flange and at least one stiffener member welded to the outer side of said main plate and extending away from said main plate in the same general direction as said flange.

4. The container support assembly of claim 1, including upstanding means located on said horizontal foot of said container support member for locating a load bearing structural portion of a container supported thereon.

5. The container support assembly of claim 1 wherein said main load support member is of steel plate material at least one inch thick and bent without heating with an inner surface having a resultant radius of curvature of not more than about three inches.

6. A railroad freight car defining a well for receiving and carrying intermodal cargo containers and the like, comprising:
   (a) a pair of body bolsters extending transversely;
   (b) a pair of side sills extending longitudinally of the car and attached respectively to said body bolsters, each of said side sills being of lightweight construction including
      (i) a deep top tube portion,
      (ii) a web plate depending from said top tube, said web plate including a longitudinally extending upper portion and a longitudinally extending lower portion disposed diagonally downward and inward at an obtuse angle to said longitudinally extending upper portion of said web plate;
      (iii) a bottom chord welded to said lower panel and made of material of a significantly greater thickness than that of said web plate and including an upwardly directed portion and a generally horizontal portion interconnected by a bend extending horizontally and longitudinally of the car, said lower portion of said lower chord extending laterally inward of the car.

7. A railroad freight car defining a well for receiving and carrying intermodal cargo containers and the like, comprising:
   (a) a pair of body bolsters extending transversely;
   (b) a pair of side sills extending longitudinally of the car and attached respectively to said body bolsters, each of said side sills being of lightweight construction including
      (i) a deep top tube of rectangular shape;
      (ii) a web plate depending from said top tube, said web plate including a longitudinally extending upper portion and a longitudinally extending lower portion defined by a longitudinally extending bend in said web plate;

(iii) a bottom chord of plate metal of a significantly greater thickness than that of said web plate and having an upwardly extending portion and a generally horizontal portion interconnected by an 8. A railroad freight car including a container well for receiving an intermodal cargo container, comprising:
(a) a pair of body bolsters extending transversely;
(b) a pair of upstanding side sills extending longitudinally of the car and attached respectively to said body bolsters, said container well for receiving an intermodal cargo container being defined between said body bolsters and side sills;
(c) a plurality of container support members associated with said side sills, each of said container support members consisting primarily of a thick metal plate cold formed to include a generally horizontally extending portion including means for receiving a cargo container resting thereon, and a generally upwardly directed portion;
(d) respective attachment means for connecting said container support members to said side sill; and
(e) respective transverse members interconnecting said generally horizontally extending portions of laterally oppositely located ones of said container support members, said transverse members being connected to respective ones of said container support members by respective hinges attached to said horizontally extending portions, said hinges defining hinge pivot axes extending horizontally and longitudinally of said car and permitting said container support members to flex downwardly with respect to said side sills and apply tension to said transverse members without application of bending stress thereto.

9. A railroad freight car including a container well for receiving an intermodal cargo container, comprising:
(a) a pair of body bolsters extending transversely;
(b) a pair of upstanding side sills extending longitudinally of the car and attached respectively to said body bolsters, said container well for receiving an intermodal cargo container being defined between said body bolsters and side sills;
(c) a plurality of container support members associated with said side sills, each of said container supports consisting primarily of a thick metal plate cold formed to include a generally horizontally extending portion including means for receiving a cargo container resting thereon, and a generally upwardly directed portion; and
(d) respective attachment means for connecting said container support members to said side sills, said attachment means including a respective container support hangar bracket of metal plate welded to one of said side sills for each of said plurality of container support members, each of said container support hanger brackets and container support members defining a plurality of fastener bores aligned with one another, and each of said container supports being fastened to a respective one of said container support hanger brackets by mechanical fasteners extending through said fastener bores.

10. The freight car of claim 9 wherein each of at least one pair of said container support members includes two upwardly extending legs, said car further including a pair of transversely extending end container support hanger brackets each attached to one of said body bolsters and a leg of each of said pair of container supports being fastened by mechanical fasteners to a respective one of said end container support hanger brackets.

11. The freight car of claim 9 wherein each of at least one pair of said container support members includes two upwardly extending legs, said car further including a pair of end container support hanger brackets each attached to a respective one of said side sills, and one of said upwardly extending legs of each of said pair of container support members being connected to a respective one of said end container support hanger brackets by a plurality of mechanical fasteners.

12. A railroad freight car defining a well for receiving and carrying intermodal cargo containers and the like, comprising:
(a) a pair of body bolsters extending transversely;
(b) a pair of side sills extending longitudinally of the car and attached respectively to said body bolsters, each of said side sills being of lightweight construction including
(i) a deep top tube of rectangular shape, said top tube including a channel structure, formed of plate material having a pair of outwardly directed legs and a vertical central portion, and a vertical outer side;
(ii) a web plate depending from said top tube, said web plate being an extension of said outer side of said top tube and including a longitudinally extending upper portion and a longitudinally extending lower portion defined by a longitudinally extending bend in said web plate; and
(iii) a bottom chord of plate metal of a significantly greater thickness than that of said web plate and having an upwardly extending portion and a generally horizontal portion interconnected by an arcuate bend extending longitudinally of the car, said lower portion of said lower chord extending laterally inward of the car.

13. A railroad freight car defining a well for receiving and carrying intermodal cargo containers and the like, comprising:
(a) a pair of body bolsters extending transversely;
(b) a pair of side sills extending longitudinally of the car and attached respectively to said body bolsters, each of said side sills being of lightweight construction including
(i) a deep top tube of rectangular shape;
(ii) a web plate depending from said top tube, said web plate including a longitudinally extending lower portion defined by a longitudinally extending bend in said web plate; and
(iii) a bottom chord of plate metal of a significantly greater thickness than that of said web plate and having an upwardly extending portion and a generally horizontal portion interconnected by an arcuate bend extending longitudinally of the car, said lower portion of said lower chord extending laterally inward of the car; and
(c) a plurality of container support assemblies each including a container support member of thick plate metal cold formed to include a generally horizontally extending foot portion and a generally upwardly directed portion, attached by a plurality of mechanical fasteners to a respective container support hanger bracket of relatively thin metal plate welded to one of said side sills.

14. The railroad car of claim 13 wherein said foot portions of said container support members rest atop the horizontal, inwardly directed portion of said bottom chord of said side sill structure.

15. The railroad car of claim 13 wherein a pair of said container support assemblies are located laterally opposite each other, a transversely extending member and a pair of hinges interconnecting the container support members of said pair of container support assemblies, each end of said transversely extending member being attached to a respective one of said container support members by one of said hinges.

16. A railroad freight car defining a well for receiving and carrying intermodal cargo containers and the like, comprising:
   (a) a pair of body bolsters extending transversely;
   (b) a pair of side sills extending longitudinally of the car and attached respectively to said body bolsters, each of said side sills being of lightweight construction including
      (i) a deep top tube of rectangular shape having an outer side, an inner side, a top, and a bottom, defining a top tube depth;
      (ii) a web plate depending from said top tube, said web plate including a longitudinally extending upper portion wherein said upper portion of said web plate extends downward as a coplanar extension of said outer side for a distance approximately equal to said top tube depth and a longitudinally extending lower portion defined by a longitudinally extending bend in said web plate, said lower portion of said web plate extending diagonally downward and inward from said upper portion and having a height approximately equal to said depth of said top tube and having a bottom margin located substantially beneath said top tube; and
      (iii) a bottom chord of plate metal of a significantly greater thickness than that of said web plate and having an upwardly extending portion and a generally horizontal portion interconnected by an arcuate bend extending longitudinally of the car, said lower portion of said lower chord extending laterally inward of the car, wherein said upwardly extending portion of said bottom chord overlaps said bottom margin of said lower portion of said web plate and is welded thereto.

* * * * *

UNITED STATES PATENT AND TRADEMARK OFFICE
CERTIFICATE OF CORRECTION

PATENT NO.   : 4,893,567
DATED        : January 16, 1990
INVENTOR(S)  : Charles C. Hill et al.

It is certified that error appears in the above-identified patent and that said Letters Patent is hereby corrected as shown below:

COL. 4,  Line 67        Change "f" to --of--.

COL. 5,  Line 40        Change "or" to --of--.

COL. 13, Lines 45-46    Change "supports" to read --support members--;

Line 60        Change "supports" to read --support members--.

COL. 14, Line 50        Insert, before "lower portion", --upper portion and a longitudinally extending--.

Signed and Sealed this

Twenty-first Day of January, 1992

Attest:

HARRY F. MANBECK, JR.

*Attesting Officer*                *Commissioner of Patents and Trademarks*

UNITED STATES PATENT AND TRADEMARK OFFICE
CERTIFICATE OF CORRECTION

PATENT NO.   :  4,893,567

DATED        :  January 16, 1990

INVENTOR(S)  :  Charles C. Hill, et al.

It is certified that error appears in the above-identified patent and that said Letters Patent is hereby corrected as shown below:

| | | |
|---|---|---|
| Col. 12, | line 53 | Change "lower", second occurrence, to --bottom--. |
| Col. 13, | line 5 | After "an" insert --arcuate bend extending longitudinally of the car, said lower portion of said bottom chord extending laterally inward of the car.-- |
| Col. 14, | line 37 | Change "lower", second occurrence, to --bottom--. |
| | line 57 | Change "lower", second occurrence, to --bottom--. |
| Col. 16, | line 18 | Change "lower", second occurrence, to --bottom--. |

Signed and Sealed this

Fourth Day of August, 1992

Attest:

DOUGLAS B. COMER

*Attesting Officer*    Acting Commissioner of Patents and Trademarks

UNITED STATES PATENT AND TRADEMARK OFFICE
CERTIFICATE OF CORRECTION

PATENT NO. : 4,893,567

DATED : January 16, 1990

INVENTOR(S) : Charles C. Hill et al.

It is certified that error appears in the above-identified patent and that said Letters Patent is hereby corrected as shown below:

Col. 13, line 5, After "an" insert --arcuate bend extending longitudinally of the car, said lower portion of said lower chord extending laterally inward of the car.--

Signed and Sealed this

First Day of March, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 4,893,567
DATED : January 16, 1990
INVENTOR(S) : Charles C. Hill et al.

It is certified that error appears in the above-identified patent and that said Letters Patent is hereby corrected as shown below:

| | | |
|---|---|---|
| Col. 12, | Line 53 | Delete "lower" (first occurrence thereof) and insert --horizontal-- in place thereof. |
| Col. 13, | Line 5 | After "an" substitute the following for the insertions previously made at that location by Certificates of Correction --arcuate bend extending longitudinally of the car, said horizontal portion of said bottom chord extending laterally inward of the car.-- |
| Col. 14, | Line 37 | Delete "lower" (first occurrence thereof) and insert --horizontal-- in place thereof; |
| | Line 57 | Delete "lower" (first occurrence thereof) and insert --horizontal-- in place thereof. |
| Col. 16, | Line 18 | Delete "lower" (first occurrence thereof) and insert --horizontal-- in place thereof. |

Signed and Sealed this

First Day of November, 1994

Attest:

BRUCE LEHMAN

Attesting Officer     Commissioner of Patents and Trademarks

REEXAMINATION CERTIFICATE (2613th)
United States Patent [19]

Hill et al.

[11] B1 4,893,567

[45] Certificate Issued    Jun. 27, 1995

[54] RAILROAD FREIGHT CAR WITH WELL FOR STACKED CARGO CONTAINERS

[75] Inventors: Charles C. Hill; Gareth R. Thomas, both of Del Mar, Calif.; Gary S. Kaleta, Warren; Gregory J. Saxton, Portland, both of Oreg.

[73] Assignee: Gunderson, Inc., Portland, Oreg.

Reexamination Request:
No. 90/003,485, Jul. 8, 1994

Reexamination Certificate for:
Patent No.: 4,893,567
Issued: Jan. 16, 1990
Appl. No.: 234,332
Filed: Aug. 18, 1988

Certificate of Correction issued Jan. 21, 1992.

Certificate of Correction issued Aug. 4, 1992.

Certificate of Correction issued Mar. 1, 1994.

Certificate of Correction issued Nov. 1, 1994.

[51] Int. Cl.$^6$ .................................... B61D 17/08
[52] U.S. Cl. ............................ 105/419; 105/4.1; 410/52
[58] Field of Search ........... 105/418, 419, 414, 406.1, 105/404, 411, 4.1; 410/52, 90, 71

[56] References Cited

U.S. PATENT DOCUMENTS

| | | | |
|---|---|---|---|
| 3,357,371 | 12/1967 | Gutridge | 105/366 |
| 4,452,147 | 6/1984 | Jwuc | 105/4 |
| 4,456,413 | 6/1984 | Pavlick | 410/56 |
| 4,524,699 | 6/1985 | Pavlick | 105/4 |
| 4,624,188 | 11/1986 | Kaleta | 105/355 |
| 4,718,353 | 1/1988 | Schuller et al. | 105/406.1 |
| 4,750,431 | 6/1988 | Yates et al. | 105/4.1 |
| 4,754,709 | 7/1988 | Gramse et al. | 105/355 |
| 4,771,706 | 9/1988 | Lindauer et al. | 105/415 |
| 4,782,762 | 11/1988 | Johnstone et al. | 137/355 |
| 4,805,539 | 2/1989 | Ferris et al. | 105/355 |
| 4,841,876 | 6/1989 | Gramse et al. | 105/406.1 |

OTHER PUBLICATIONS

The Youngstown Steel Door Company, Brochure, "The Low-Pro TM Experimental Energy Efficient Railcar," 1979.

"Lo-Pac 2000" Brochure, The Budd Company.

Backpacker TM - The Cost Effective Solution to Changing Intermodal Needs, Trinity Industries, Inc.

Twin-Stack TM: The New COFC Car from FMC/Greenbrier Leasing Corporation.

*Primary Examiner*—David M. Mitchell

[57] ABSTRACT

A multi-unit articulated railway freight car defining a container well in each of the several units, with container support members attached to the side sills of each unit to support standard intermodal cargo containers at a location low enough to permit a second tier of containers to be stacked atop a bottom tier without exceeding the maximum height restrictions of most main railroad lines, although ample clearance is preserved beneath the bottom of the car when fully loaded. Each container support member is constructed of thick plate steel of high strength, formed cold to include residual internal stresses in order to resist failure when subjected to the loads imposed by supporting loaded containers carried in the container well. The side sill structures are of box tube and formed sheet construction of small enough width to permit carriage of newer, larger, sizes of intermodal cargo containers without the car or containers protruding outside the clearance available along most railroad lines. A truss structure interconnects the bottom chords of the side sills and interconnects the carbon container support members. Members of the truss structure are attached to the cargo container support members by hinges.

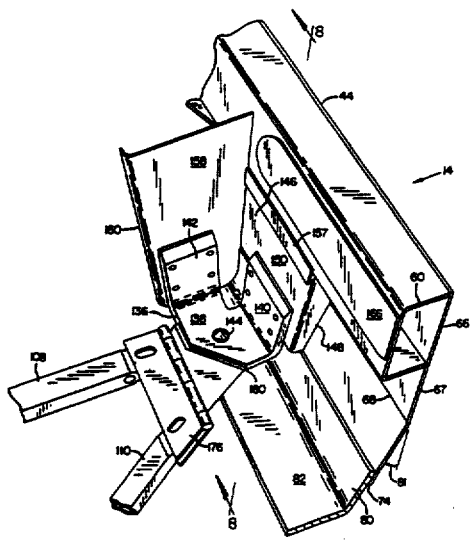

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-16 is confirmed.

* * * * *